United States Patent [19]
Leuthold et al.

[11] Patent Number: 5,993,066
[45] Date of Patent: *Nov. 30, 1999

[54] FLUID RETENTION PRINCIPLE FOR HYDRODYNAMIC BEARINGS

[75] Inventors: Hans Leuthold, Santa Cruz, Calif.; Coda H. Pan, Millbury, Mass.; David John Jennings, Santa Cruz, Calif.; Lakshman Nagarathnam, Capitola, Calif.; Raquib U. Khan, Pleasanton, Calif.; Wesley Ronald Clark, Watsonville, Calif.; Gunter Heine, Aptos, Calif.

[73] Assignee: Seagate Technology, Inc., Scotts Valley, Calif.

[ * ] Notice: This patent is subject to a terminal disclaimer.

[21] Appl. No.: 08/963,651

[22] Filed: Nov. 3, 1997

Related U.S. Application Data

[63] Continuation of application No. 08/634,335, Apr. 12, 1996, abandoned, which is a continuation of application No. 08/284,126, Aug. 2, 1994, Pat. No. 5,524,986.

[51] Int. Cl.$^6$ ...................................... F16C 17/10
[52] U.S. Cl. .......................... 384/113; 384/123; 384/130; 384/381
[58] Field of Search ..................................... 384/100, 107, 384/114, 119, 132; 381/372, 375, 376, 380, 381

[56] References Cited

U.S. PATENT DOCUMENTS

| | | | |
|---|---|---|---|
| 4,795,275 | 1/1989 | Titcomb et al. | 384/132 X |
| 4,883,367 | 11/1989 | Maruyama | 384/107 X |
| 5,018,881 | 5/1991 | Asada | 384/107 X |
| 5,141,338 | 8/1992 | Asada et al. | 384/114 |
| 5,246,294 | 9/1993 | Pan | 384/119 |
| 5,487,608 | 1/1996 | Leuthold et al. | 384/113 |

*Primary Examiner*—Thomas R. Hannon
*Attorney, Agent, or Firm*—Flehr Hohbach Test Albritton & Herbert LLP

[57] ABSTRACT

A hydrodynamic bearing design is disclosed incorporating a flexible membrane at one end of the fluid gap in the hydrodynamic bearing. If voids exist in the fluid, and if changes in the size of these voids or bubbles occur with changes in temperature or pressure in which the disc drive is being used, then the volume of the fluid will change, and increase relative to the change in size of the volume of the surrounding physical part. The flexible membrane will yield to the increased pressure of the increasing volume of the fluid. The membrane essentially acts as a spring whose spring force is overcome by the pressure created by or accompanying a increase in volume in which the lubricating fluid is contained, and preventing its escape or being forced out of the inner region of the bearing.

24 Claims, 5 Drawing Sheets

FLUID RETENTION PRINCIPLE FOR HYDRODYNAMIC BEARINGS

RELATED APPLICATIONS

This is a continuation of application Ser. No. 08/634,335 filed Apr. 12, 1996, now abandoned, which is a continuation of Ser. No. 08/284,126 filed Aug. 2, 1994, now U.S. Pat. No. 5,524,986.

This application is related to and may be used in common with the invention disclosed in, Ser. No. 08/279,195 entitled "Hub Disc Assembly With Integrated Air-bearing", inventor: H. Leuthold et. al, as well as Ser. No. 08/279,199 entitled "Single Plate Hydrodynamic Bearing With Self-Balancing Fluid Level", inventor: Hans Leuthold et al., and Ser. No. 08/278,754 entitled "Single Plate Hydrodynamic Bearing With Self-Balancing Fluid Level and Fluid Circulation", inventor: Hans Leuthold et al., all of said applications being assigned to the assignee of the present invention and incorporated herein by reference.

FIELD OF THE INVENTION

The present invention relates to the field of hydrodynamic bearing assemblies of the type which provide support and rotation for high speed spindle element. More specifically, the present invention relates to hydrodynamic bearing assemblies utilized in an disc drive recording system.

BACKGROUND OF THE INVENTION

Disc drive memory systems have been used in computers for many years for storage of digital information. Information is recorded on concentric memory tracks of a magnetic disc medium, the actual information being stored in the form of magnetic transitions within the medium. The discs themselves are rotatably mounted on a spindle the information being accessed by means of read/write heads generally located on a pivoting arm which moves radially over surface of the disc. The read/write heads or transducers must be accurately aligned with the storage tracks on the disc to ensure proper reading and writing of information.

During operation, the discs are rotated at very high speeds within an enclosed housing by means of an electric motor generally located inside the hub or below the discs. One type of motor in common use is known as an in-hub or in-spindle motor. Such in-spindle motors typically have a spindle mounted by means of two ball bearing systems to a motor shaft disposed in the center of the hub. However, with the decreasing size of information storage systems, other types of bearings including hydrodynamic bearings are being developed. Useful designs are disclosed in the incorporated applications.

In these types of systems, lubricating fluid—either gas or liquid—functions as the actual bearing surface between a stationary base or housing and the rotating spindle or rotating hub and the stationary surrounding portion of the motor. For example, liquid lubricants comprising oil, more complex ferro-magnetic fluids, or even air have been utilized for use in hydrodynamic bearing systems. The reason for the popularity of the use of air, is the importance of avoiding the outgassing of contaminants into the sealed area of the head disc housing. However, air does not provide the lubricating qualities of oil. Its low viscosity requires smaller bearing gaps and therefore higher tolerance standards to achieve similar dynamic performance.

Thus, in the case of a hydrodynamic bearing employing a liquid lubricant, the lubricating fluid and its components must be sealed within the bearing to avoid loss of lubricant which results in reduced bearing load capacity. Otherwise, the physical surfaces of the spindle and housing could contact one another, leading to increased wear and eventual failure of the bearing system. Equally seriously, loss of a seal or failure to control the fluid level within the bearing system could cause contamination of the hard disk drive with lubricant particles and droplets as well as outgassing-related condensation.

A further difficulty with prior art designs of liquid lubrication hydrodynamic bearings is that frequently voids or gas bubbles may occur in the bearing area.

Temperature changes of the assembly will result in volume changes of (in order of importance) the gas bubbles, the liquid lubricant and the solid container (i.e. bearing assembly internal volume). Generally the volume of gas bubbles and volume will increase relative to its containers. Thus the problem presented is to prevent the lubricant from spilling out of the container if such a relative increase in volume occurs.

SUMMARY OF THE INVENTION

It is therefore an object of the present invention to provide means for preventing the lubricant from spilling out of the bearing in the event of a relative increase in the volume of fluid in the bearing.

It is a further object of the present invention to provide a hydrodynamic bearing in which the fluid level and sealing of the fluid within the hydrodynamic bearing is controlled to prevent or avoid potential contamination of a hard disc drive.

In summary, the present invention comprises a modification of hydrodynamic bearing designs to incorporate a flexible membrane at one end of the fluid gap in the hydrodynamic bearing. If voids exist in the fluid, and if changes in the size of these voids or bubbles occur with changes in temperature or pressure in which the disc drive is being used, then the volume of the fluid will change, and increase relative to the change in size of the volume of the surrounding physical part. Therefore, rather than allow the fluid to be forced out of the bearing region wherein it is normally contained, the flexible membrane will yield to the increased pressure of the increasing volume of the fluid. The membrane essentially acts as a spring whose spring force is overcome by the pressure created by or accompanying an increase in volume of the fluid. As this happens, the spring force of the membrane is overcome, the membrane relaxes and forms a bladder, effectively increasing the volume in which the lubricating fluid is contained, and preventing its escape or being forced out of the inner region of the bearing. In this way, the fluid remains in the bearing and will not enter the surrounding atmosphere, nor will it be lost from the journal bearing region so that the hydrodynamic bearing is not as effective, when the temperature decreases or the pressure drops.

BRIEF DESCRIPTION OF THE DRAWINGS

Other features and advantages of this invention will be apparent froma study of the following disclosure, given with respect to the accompanying drawings.

DETAILED DESCRIPTION OF A PREFERRED EMBODIMENT

A spindle motor and disc assembly for use in disc drive computer systems is disclosed herein. The special purpose of the present invention is to modify the design of a spindle motor incorporating a hydrodynamic bearing for the main rotating shaft for use in a hard disc drive application so that the lubrication fluid does not contaminate the inside of the hard disc drive with particles, droplets or outgassing. A major concern in the design of a hydrodynamic hard disc drive spindle is to make sure that the lubricant or fluid stays confined to the region where it lubricates the rotating surfaces, and cannot migrate toward the regions where the data storing discs are located.

Figure 1:
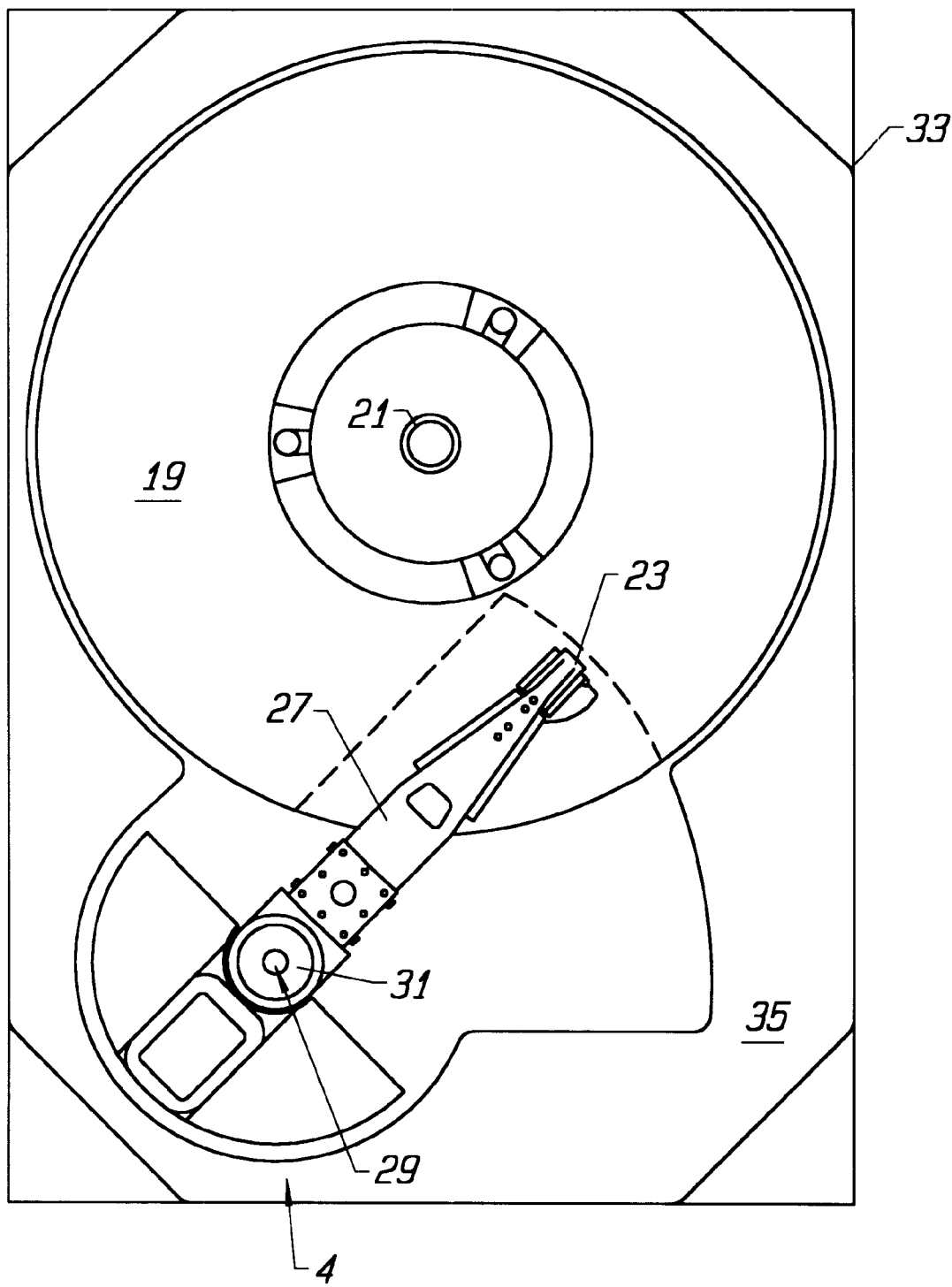
FIG. 1 is a top plan view of a disc drive in which the present invention is useful.

Referring to FIG. 1, this figure is a top plan view illustrating the basic element of a disc drive in which the invention is useful including the rotating disc or discs 19 which are rotated by the spindle 21 of a spindle motor (not shown). As the discs rotate, a transducer 23 mounted on the end of an actuator arm 27 is selectively positioned by a voice coil motor 29 rotating about a pivot 31 to move the transducer 23 from track to track over the surface of the disc. All of these elements are mounted in a housing 33 which is typically an air-tight housing to minimize the possibility of any contaminants reaching the surface of the disc. Such contaminants could interfere with the reading and writing of data on the surface of the disc by the transducer, the transducer itself having an extremely fine gap at which reading/writing occurs, and in today's technology flying extremely close to the surface of the disc. A typical spindle motor for providing constant high-speed rotation to the disc mounted thereon is shown in vertical section in FIGS. 2A and 2B.

These figures shows only a single disc 19 supported from the spindle or hub 21; obviously a significant number of discs could be supported from the hub of a motor of this type here. The figure is intended to show, for the sake of comparison, both the old (FIG. 2A) and the new (FIG. 2B) approach to bearing supports for a rotating shaft type of motor.

Figures 2A, 2B:
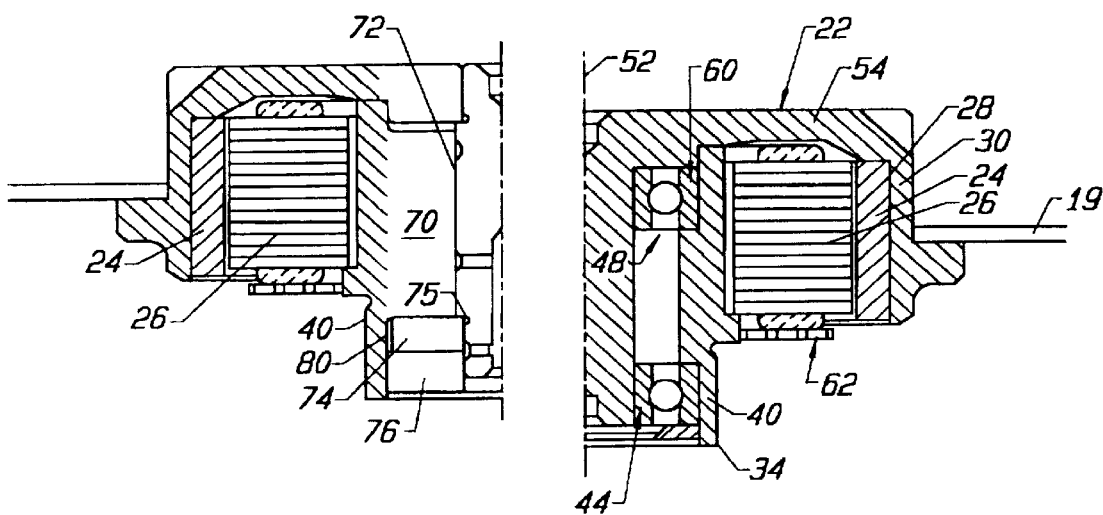
FIGS. 2A and 2B are vertical sectional views of a motor incorporating ball bearings (FIG. 2A) and a hydrodynamic bearing (FIG. 2B)

A magnet 28 is supported on the interior vertical surface of the cavity defining hub element 30. A stator 26 is supported by the sleeve 40 which is adapted to be fitted into a base of the housing 34 at its lower end. In FIG. 2A, standard mechanical bearings 44, 48 support the rotating shaft 52 for rotation about the central axis 52. Obviously the top horizontal portion of the hub 54 and the vertical disc supporting portion of the hub 30 rotate with this shaft. Meanwhile, the outer race 60 of each bearing supports the sleeve which in turn supports the stator on an external surface thereof. The energization of the stator to cause rotation of the hub by interaction of the stator with the magnet 24 is caused by controlled electrical signals provided on wires 62 to the coil windings.

The left hand view, FIG. 2B shows the basic elements of the hydrodynamic bearings with which the present invention is concerned. In this case, rather than finding ball bearings 48 and 44 supporting the interior surface of the sleeve, the sleeve is a single solid stationary piece 70 which on its interior surface 72 forms the bushing of the journal bearing. This bushing 72 faces the shaft 52 which is rotating past the fixed bushing.

At the lower end of the rotating shaft 52 near the base of the disc drive, a thrust plate 74 is stepped into the shaft near its lower end, and extends into a recess defined by the lower end of the bushing 72 and the upper surface of counterplate 76. This counterplate 76 to the thrust plate 74 is preferably pressed in place against the lower portion 40 of the sleeve, or sits against a step in the bushing in order to fix its position.

Figure 3:
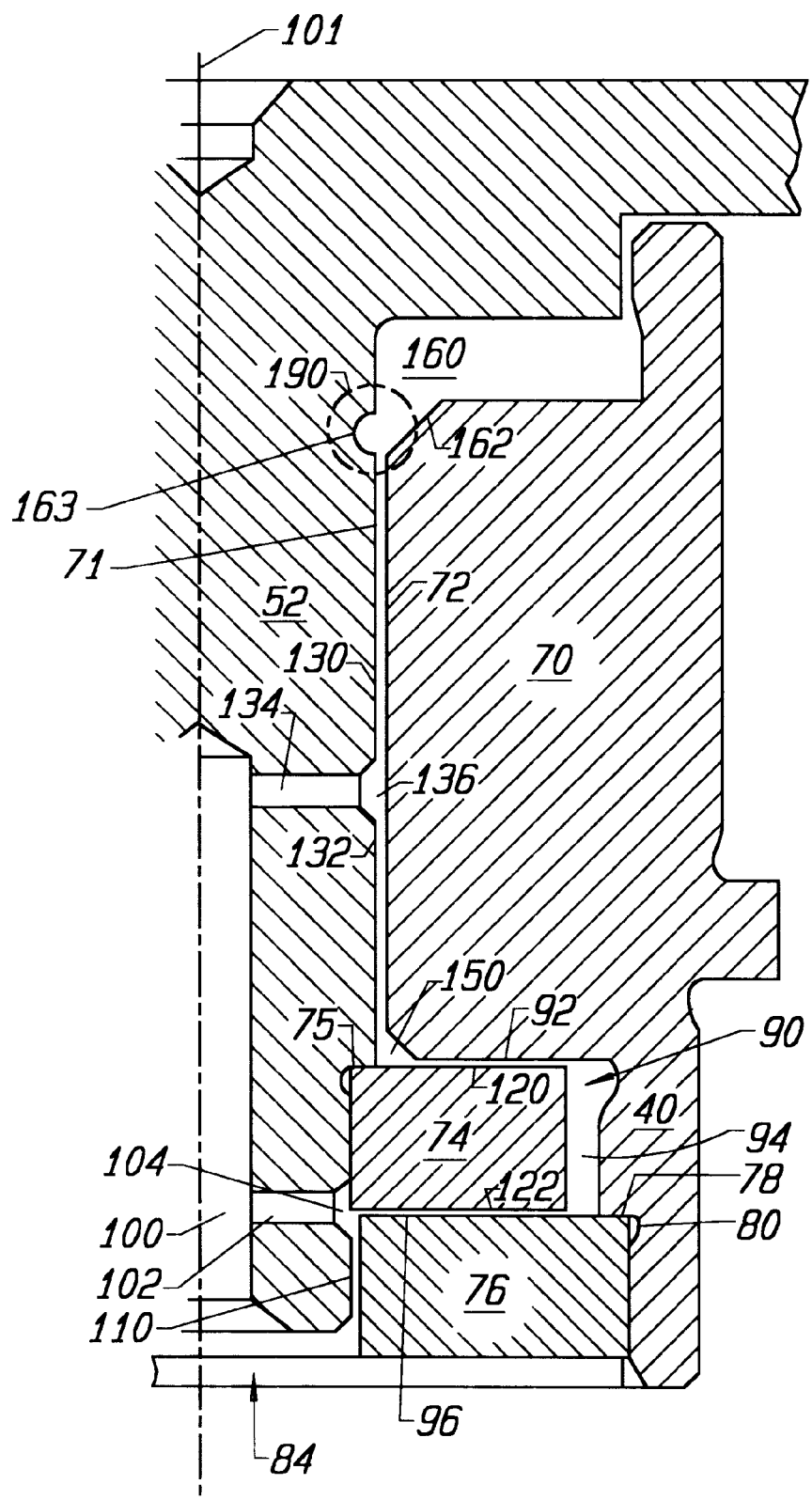
FIG. 3 is a detailed view of a section of the hydrodynamic bearing of the motor of FIG. 2B.

The details of the present invention, and especially the placement of the elements and the gaps defined thereby, can best be understood hereafter by reference to FIG. 3, which is an enlarged view of the details of the hydrodynamic bearing shown in FIG. 2B.

Immediately below the counterplate 76 is located a shield 84 which is provided to close the bearing assembly from the outside. Obviously, although not shown herein, the lower outer portion of the sleeve 40 could be inserted in a base casting 35 of the disc drive in order to securely hold the entire spindle motor in a precise location and orientation. Returning to the lower thrust bearing, it is clear that the thrust plate 74 is rotating in a recess 90 defined by an axial face of the bushing 70 on its upper side, the sleeve 40 to the side, and an axial face defined by counterplate 76 at the lower end; these positions must all be securely fixed as the gaps are very fine. The thrust bearing thus comprises the gap 92 between bushing 72 and thrust plate 74, the gap 94 between sleeve 40 and thrust plate 74, and the gap 96 between thrust plate 74 and counterplate 76, all defined by the axial force equilibrium resulting from thrust forces or lifts created in gaps 92 and 96 and any external axial force applied to the shaft with respect to the sleeve. Generally speaking, the direction of fluid flow through the bearing will be from the reservoir 100 through the lower equilibrium groove 104 and radial bore 102, which is shown immediately adjacent the thrust plate 74 and the counter plate 76. Bore 102 and groove 104 connect the inner boundary of the lower thrust bearing to the reservoir 100, forcing an ambient pressure boundary condition.

If the gap around the lower portion of the shaft, specifically between shaft and counterplate 76 and shaft and shield 84 is large enough, it satisfies the circulation requirements on bore 102, which in turn may be left out. The circulating fluid will enter the thrust bearing through the radial bore 102 from the center bore reservoir 100, and circulate through the gaps 96, 94, 92 toward the middle equipressure groove 150. This fluid circulation and pressure definition is enhanced by a herringbone pattern pressed or otherwise defined on the upper and lower surfaces 120, 122 of the thrust plate 74 as will be described more fully below.

The fluid circulation and necessary pressure differentials are further created by the use of upper and lower journal bearings defined between the rotating shaft 52 and the bushing 72 or sleeve 70. Alternate embodiments with spiral grooves defined on the shaft instead of on the bushings are possible without significantly altering the behavior of the design.

The upper and lower journal bearings 130, 132 are separated by equipressure groove 136 and bore 134 in the rotating shaft 52 adjacent the bushing 72. The upper and lower journal bearings 130, 132 are further defined by a herringbone pattern comprising multiple (at least 2) spiral-groove axial sections pressed or otherwise defined into the surface of the bushing 72 or sleeve 70. The geometry of this pattern is such that relative motion between the fluid and the sleeve 70 surface will build up a positive pressure with respect to both ends of the bearing, thereby normally maintaining the fluid within the journal bearing rather than allow it to escape into the region of the support for the hard disk drives.

The upper journal bearing 130 is also defined between the rotating shaft 52 and sleeve 70, and has a similar groove pattern as described with respect to the lower journal bearing—that is, comprising a herringbone pattern—such that positive pressure is built up and established with respect to both ends of the bearing.

As previously mentioned, the path of the circulation of the fluid through the journal bearing and the thrust bearing includes an equipressure groove 136 and a radial bore 134, and a reservoir 100 which comprises a center bore in the rotating shaft, filled with lubricant. This reservoir is open to the shield 84 and allows fluid flow through gap as shown. If gas bubbles or a void should appear in the fluid, they will be trapped in this center bore due to the centrifugal force differential between the heavier circulating fluid and the lighter bubble, thereby diminishing the prospect of a bubble or void appearing in one of the thrust or journal bearings. This quality is especially important during the assembly and filling process where the reservoir is used to fill and bleed the bearing properly.

It should also be noted that the radial thrust plate gap 94 adjacent the end of the radial thrust plate 74 and between that end and the sleeve 70, is also filled with lubricant.

The upper equipressure groove 136 and radial bore 134 connect the upper boundary of the lower journal bearing 132 and the lower boundary of the upper journal bearing 130 to the reservoir 100, thus enforcing an ambient pressure boundary condition. The circulating fluid thus can leave the journal bearings through the radial bore and travel into the center bore reservoir 100 in order to maintain proper fluid circulation. A middle equipressure groove 150 is also provided at the junction or intersection between the lower journal bearing 132 and the upper thrust bearing 92 where said thrust plate joins said shaft. This groove is filled with lubricant and is large enough to enforce an infinite manifold boundary condition between the upper thrust bearing and lower journal bearing.

Figure 5A:
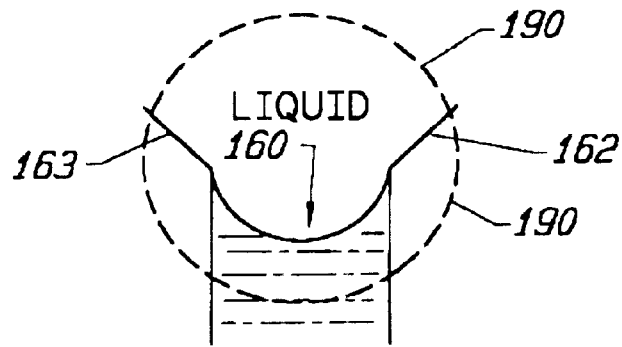
FIGS. 5A and 5B are enlarged views of the bearings of FIGS. 3 and 4 illustrating features of this invention.

The exemplary hydrodynamic bearing further includes a capillary seal 160 which is the radial gap between the rotating shaft 52 and the sleeve 70 at least one and preferably both of the two facing surfaces of these two items having a progressively increasing width as shown here at 162, 163. That is, as is readily apparent from FIG. 3 and the exaggerated view in FIG. 5A of the circled region 190 of FIG. 3, the walls 71, 72 of the shaft 52 and sleeve 70 are generally parallel to the axis 101 of the shaft 52, diverging at region 190 where the capillary seal 160 forms. Thus sleeve wall 72 angles linearly 162 away from axis 101 of shaft 52; shaft wall angles initially toward axis 101, curving to form a semicircular region 163. The capillary action due to the surface tension in the fluid prevents the fluid in the hydrodynamic bearing from spilling out of the bearing in a standstill condition.

Figure 4B:
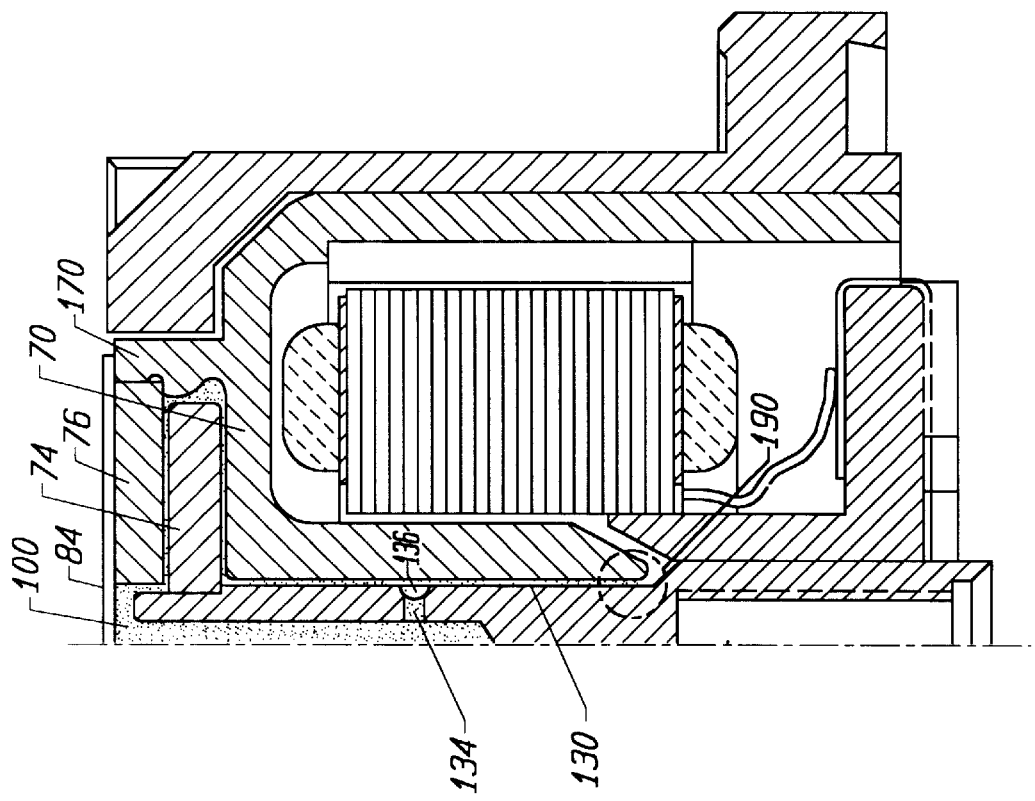
FIGS. 4A and 4B are vertical sectional views of a fixed shaft motor utilizing ball bearings (FIG. 4A) and a hydrodynamic bearing (FIG. 4B)
Figure 4A:
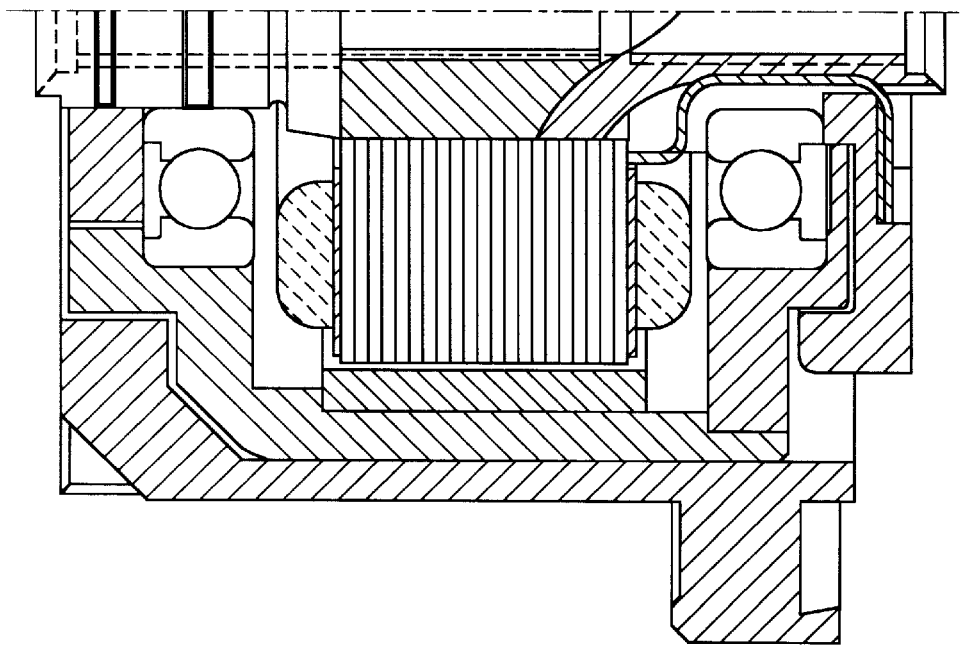

FIGS. 4A and 4B illustrate that the same essential elements are present in a design utilizing a fixed shaft. In such a design, the reservoir 100 is toward the top of the shaft, and the fluid which will surround the thrust plate 74 exits through the end of the shaft and circulates through the gaps defined by the thrust plate and the counterplate 76, the end of the thrust plate 74 and rotating sleeve 170, and the top of the thrust plate 74 and the base of the rotating bushing or sleeve. In the designs of FIG. 3 and FIGS. 4A and 4B, the end of the journal bearing opposite the thrust plate defines the only opening of the lubricant container to the outside and thus to the head disc assembly. This region 190 is identified by a circle of dashed lines in both FIGS. 3 and 4B.

Part of the reason that the upper journal bearing 130 in both the designs of FIGS. 3 and 4 remains filled with lubricant is that capillary forces push the lubricant into the upper journal bearing much as the liquid is pushed up a drinking straw sticking into a larger body of that same liquid. The capillary force results from the liquid surface tension at its upper boundary or meniscus which exists in the region 190. This meniscus in the region 190 is shown exaggerated in FIG. 5A. The resulting pressure for maintaining the fluid in the gap is inversely proportional to gap width squared. As the lubricant is pushed into the upper journal bearing, it creates a negative relative pressure in the rest of the sealed bearing system. This negative, relative pressure potentially limits the amount of lubricant which is pumped into the upper journal bearing, and pushes against the volume of the gas bubbles which are almost inevitably formed in the system.

Figure 5B:
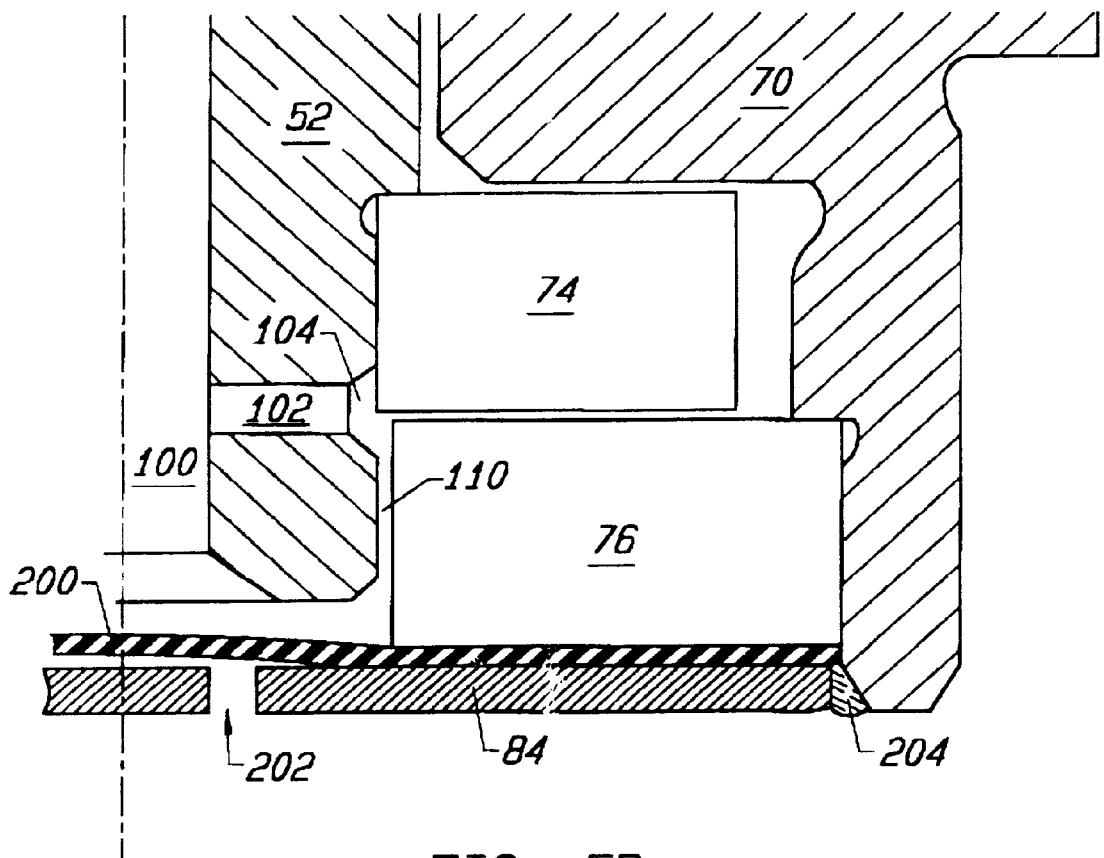

At the other end of the journal bearing, FIG. 5B shows the shield 84 at the bottom of the base of the shaft, whether fixed or rotating, which closes off the bottom of the lubricant container 100. Typically, a gap will exist between the shaft 52 and the counterplate 76; this gap provides communication between the bottom portion of the fluid reservoir or fluid bearing and the top portion 190 which we have identified as being closed off by a capillary seal. In order to provide means for absorbing the increase in volume which may be created by the thermal expansion of the liquid or the bubbles contained in the liquid, the solid shield 84 may be replaced by a flexible membrane 200 which now closes off the bottom of the reservoir 100 in gap 10. The shield 84 remains in place below the flexible membrane, but preferably with the addition of a breather hole 202. As appears clearly in FIG. 5B, the shield 84 is held in place against the inner of the sleeve by an adhesive bead 204. The same adhesive bead typically will hold the shield 84 in place; alternatively, a separate adhesive bead may be used at each end of the shield 200 to adhere it to both the counterplate 76 and the upper surface of the shield 84. Once the membrane is in place, the capillary force which forms the meniscus in the region 190 as shown in FIG. 4 is effectively working against a spring formed by this elastic membrane 200. If the volume of the gas bubbles and the lubricant should increase relative to the volume of the container, as may happen if the temperature increases or ambient pressure changes, the membrane will relax and eventually change its shape to form a bladder, providing additional room for the increase in volume in the lubricant reservoir. As the membrane is flexible, and is normally flexed upward as shown in FIG. 5, when the fluid pressure created by the increased volume is reduced, then the membrane 200 will return to its original shape so that the fluid has a sufficient spring force to work against so that the capillary action will effectively maintain the lubricating fluid up to the open end of the hydrodynamic bearing.

The discussion above has demonstrated that the capillary force and the pumping force created by the spinning grooves of the journal bearing 130, 132 are of opposite direction. Therefore, it is important to follow a procedure that will guarantee that a negative pressure exists when the system is at rest, thereby allowing the formation of the capillary seal at the defined region and the retaining of fluid within the bearing, reducing the likelihood of spillage in the surrounding area. The preferred filling process is as follows: beginning with the motor at rest, a syringe or the like is used to insert into the shaft reservoir 100 an amount of oil sufficient to fill the reservoir. Time is then provided to allow the oil or lubricant to creep into the journal bearing through the radial opening 134, 102. The motor is then spun-up. The circulation path established in the bearing which is generally out through the lower thrust bearing and up through the journal bearing 132 will move the possible gas bubbles which will exist from both thrust bearings 120, 122. The radial thrust plate region 194 and the lower region bearing 132 into the axial shaft hole or reservoir 100. Spinning the motor will set the fluid level in the upper journal bearing 130 through fluid level balancing which occurs as discussed in the incorporated patent applications. If the motor is mounted hub-down, with the reservoir open to the top, the gas bubbles will exit through the axial shaft wall at the base of the reservoir 100 which is not yet closed off and can be replaced by further liquid lubricant from a syringe or the like. Bleeding is complete as soon as there are no bubbles apparent in the shaft. At this point the membrane 200 and the lower shield 84 with its opening 202 aligned below the membrane are added to seal the lower end of the assembly.

Now the motor is stopped. As the motor slows down, the pumping in the upper journal bearing disappears and the fluid will be pulled up to the end region 190 of the bearing by capillary force. As this happens, negative pressure will build up within the bearing, and the balance between the negative pressure and the capillary force will determine the height to which the fluid moves at rest. The mechanical stiffness of the shield or membrane 200 determines the amount of negative pressure in the bearing, as well as the normal amount of deformation in the shield and seal.

capillary force×level difference of lubricant=bearing volume×pressure difference+mechanical deformation of shield and seal If the membrane seal 200 is of low stiffness, as is the case with a bladder, the pressure difference will be very small. The bladder will compensate for possible volume changes in the fluid through deformation, thereby effectively retaining the fluid lubricant within the bearing even with significant changes in temperate or pressure which can cause relatively large changes in the volume of the lubricant relative to the bottom of the mechanical bearing which contains it. Alternative approaches to the present invention may become apparent to a person skilled in the art who studies the present invention disclosure, including the use of the described flexible membrane to seal other forms of hydrodynamic bearing than that disclosed herein. Therefore, the scope of the present invention is to be limited only by the following claims.

What is claimed is:

1. A fluid bearing construction for a rotary spindle apparatus comprising:
    a) a shaft having first and second ends and including at least one thrust plate coupled to the shaft;
    b) a hub having a sleeve enclosing the spindle and defining a first axial gap region between the shaft and sleeve, a second axial gap region between the thrust plate and the sleeve, a first radial gap region between an upper surface of the thrust plate and the sleeve, and a second radial gap region between a lower surface of the thrust plate and sleeve;
    c) a bearing fluid disposed in said gap regions and forming a capillary seal at one end of said spindle; a reservoir for said bearing fluid extending axially up the center of said shaft;
    d) a pressure compensation port connecting said reservoir to said first axial gap region to permit said bearing fluid to flow therebetween; and
    e) said hub including a flexible plate extending past one of the ends of said shaft and said thrust plate so that pressure in said fluid created by said surfaces remains balanced.

2. The bearing construction of claim 1 wherein the shaft includes upper and lower shaft surfaces including patterned grooves for creating a fluid pressure region along said shaft between said surfaces.

3. The bearing construction of claim 2 wherein the pressure compensation port is located exiting said shaft between said surfaces.

4. A fluid bearing construction for a rotary spindle apparatus comprising a shaft having first and second ends and having a thrust plate coupled to said shaft near a first end of said ends;
    a hub including a sleeve enclosing the shaft and defining a first axial gap region between the shaft and sleeve, a second axial gap region between an end of said thrust plate and said sleeve, a first radial gap region between an upper surface of said thrust plate and the sleeve, and a second radial gap region between a lower surface of the thrust plate and said sleeve;
    a bearing fluid disposed in said gap regions and forming a capillary seal at an end of said first axial gap region distant from said thrust plate;
    said sleeve further including a shield facing said first end of said shaft and defining an end gap between said shaft end and said shield; and
    said shaft including a reservoir extending axially into and partially through said shaft and communicating with said gap so through said fluid is distributed through said fluid bearing.

5. A fluid bearing as claimed in claim 4 wherein said shaft is fixed and said sleeve rotates relative to said shaft.

6. A fluid bearing as claimed in claim 5 including a fluid port connecting said reservoir and said first axial gap to promote fluid flow through said bearing.

7. A fluid bearing as claimed in claim 6 wherein said port is located spaced from said first and second ends of said shaft.

8. A fluid bearing as claimed in claim 4 wherein said shield is axially flexible along the axis of said shaft to maintain pressure equalization in said fluid bearing.

9. A fluid bearing construction for a rotary spindle apparatus comprising a shaft having first and second ends and having a thrust plate coupled to said shaft near a first end of said ends and a hub mounted on a second end of said shaft for rotation with said shaft;
    a sleeve enclosing the shaft and defining a first axial gap region between the shaft and sleeve, a second axial gap region between an end of said thrust plate and said sleeve, a first radial gap region between an upper surface of said thrust plate and the sleeve and a second axial gap region between a lower surface of the thrust plate and said sleeve;
    a bearing fluid disposed in said gap regions and forming a capillary seal at an end of said first axial gap region distant from said thrust plate;
    said sleeve further supporting a shield facing said first end of said shaft and defining an end between said shaft end and said shield; and
    said shaft including a reservoir extending axially partially through said shaft and communicating with said gap so that said fluid is distributed through said fluid bearing.

10. A fluid bearing for a spindle motor as claimed in claim 9 wherein a lower outer portion of said sleeve is inserted into a base casting of a housing for a disc drive.

11. A fluid bearing as claimed in claim 9 further including a bore extending from said reservoir to said gap between said shaft and said sleeve to enhance fluid circulation in said bearing.

12. A fluid bearing as claimed in claim 11 further comprising a pattern on upper and lower surfaces of said shaft establishing upper and lower journal bearings which maintain positive pressure differentials along said shaft with respect to first and second ends of said shaft.

13. A fluid bearing as claimed in claim 12 wherein said upper journal bearing extends from said bore toward said second end of said shaft and ends in a capillary seal established at a region of progressively increasing width of said gap between said shaft and said sleeve.

14. A fluid bearing as claimed in claim 12 wherein both of said shaft and said sleeve include surfaces at an angle with said axis of said shaft to form said capillary seal.

15. A fluid bearing as claimed in claim 12 wherein each of said upper and lower surfaces of said thrust plate have patterns thereon for establishing thrust bearings promoting fluid circulation through said gap of said fluid bearing.

16. A fluid bearing as claimed in claim 11 wherein at least one of said shaft or said sleeve is at an angle with an axis of said shaft at the region where said capillary seal is formed.

17. A fluid bearing as claimed in claim 16 wherein an equipressure groove is defined wherein said thrust plate joins said shaft.

18. A fluid bearing as claimed in claim 17 wherein said equipressure groove enforces a boundary condition between said thrust bearing and said lower journal bearing.

19. A fluid bearing as claimed in claim 18 wherein said shield comprises a flexible membrane closing off one side of the gap fed by said reservoir.

20. A fluid bearing as claimed in claim 18 including a flexible membrane closing off one side of said gap fed by said reservoir and said shield on the opposite side of said membrane from said gap.

21. A fluid bearing as claimed in claim 20 wherein said shield includes a breather hole for allowing flexing of said membrane with changes in internal pressure of said fluid in said bearing.

22. A fluid bearing comprising a shaft having first and second ends and having a thrust plate connected to said shaft at a first of said ends;

a hub including a sleeve enclosing the shaft and said thrust plate and defining an axial gap region between the shaft and sleeve, a first radial gap region between said thrust plate and said sleeve and communicating with the axial gap region, and a second radial gap between said thrust plate and a counterplate supported on said sleeve and communicating with said first radial gap;

a reservoir extending through said shaft and terminating at said second radial gap, said reservoir being further connected by a radial bore to said axial gap at a point between said first and second ends; and a bearing fluid disposed in said gap regions and said reservoir and forming a capillary seal between said shaft and said sleeve near said second end where said shaft and sleeve diverge.

23. In a disc drive, a spindle motor comprising a shaft, a thrust plate connected to said shaft, a sleeve surrounding said shaft and thrust plate and supporting a hub for rotation therewith, bearing means included between said thrust plate and said sleeve and supporting said sleeve for relative rotation, and fluid supply means comprising a reservoir extending at least partially through said shaft and coupled to said bearing means.

24. A motor as claimed in claim 23 further comprising sealing means defined between said shaft and said sleeve for retaining said fluid means in said region between said shaft and said sleeve.

* * * * *